US009830683B2

(12) United States Patent
Mikawa (10) Patent No.: US 9,830,683 B2
(45) Date of Patent: Nov. 28, 2017

(54) IMAGE DISPLAY DEVICE CAPABLE OF DISPLAYING IMAGE IN A DESIRED ORIENTATION, METHOD OF CONTROLLING THE SAME, AND STORAGE MEDIUM

(71) Applicant: CANON KABUSHIKI KAISHA, Tokyo (JP)

(72) Inventor: Takuma Mikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 13/973,421

(22) Filed: Aug. 22, 2013

(65) Prior Publication Data

US 2014/0055494 A1    Feb. 27, 2014

(30) Foreign Application Priority Data

Aug. 23, 2012    (JP) .................................. 2012-184137

(51) Int. Cl.
 *G06T 3/60*      (2006.01)
 *G06F 1/16*      (2006.01)
 *H04N 5/232*     (2006.01)

(52) U.S. Cl.
 CPC .............. *G06T 3/60* (2013.01); *G06F 1/1626* (2013.01); *H04N 5/23245* (2013.01); *H04N 5/23293* (2013.01)

(58) Field of Classification Search
 CPC ... G06T 3/60; G06T 3/606; G06T 2219/2016; G06F 3/04845; G06F 2200/1614; G06F 2203/04802; G06F 1/1626; H04N 1/3877; H04N 5/23293; H04N 5/23245

USPC ......................................................... 345/649
See application file for complete search history.

(56) References Cited

U.S. PATENT DOCUMENTS

| | | | |
|---|---|---|---|
| 2009/0027510 A1* | 1/2009 | Yumiki ....................... 348/222.1 |
| 2009/0303177 A1* | 12/2009 | Chou ..................... G06F 1/1626 345/156 |
| 2011/0032220 A1* | 2/2011 | Shih ....................... G06F 1/1694 345/204 |
| 2011/0032384 A1* | 2/2011 | Ono ........................... 348/231.2 |
| 2011/0267753 A1* | 11/2011 | Murayama ................. 361/679.3 |
| 2012/0032982 A1* | 2/2012 | Williamson et al. ......... 345/650 |

FOREIGN PATENT DOCUMENTS

JP    2000-312329 A    11/2000

* cited by examiner

*Primary Examiner* — Ke Xiao
*Assistant Examiner* — Jed-Justin Imperial
(74) *Attorney, Agent, or Firm* — Rossi, Kimms & McDowell LLP

(57) ABSTRACT

An image display device capable of saving time and effort required for viewing image data, to which image rotation information unintended by a user is added, in a desired orientation. An acceleration sensor detects an attitude of the image display device. A system controller controls the direction of display of an image based on the image rotation information and the detected attitude of the image display device. When the image display device is rotated from a state where the long side of the image displayed on a monitor and that of the monitor do not match each other, the system controller rotates the image such that the long sides of the image and the monitor match each other, and then, the system controller restricts rotation of the displayed image.

13 Claims, 9 Drawing Sheets

IMAGE DISPLAY DEVICE CAPABLE OF DISPLAYING IMAGE IN A DESIRED ORIENTATION, METHOD OF CONTROLLING THE SAME, AND STORAGE MEDIUM

BACKGROUND OF THE INVENTION

Field of the Invention

The present invention relates to an image display device, a method of controlling the same, and a storage medium, and more particularly to a technique for displaying an image in a desired orientation by rotating the image.

Description of the Related Art

In general, when a digital image obtained by an image pickup apparatus, such as a digital camera, is recorded, information indicative of an orientation of the digital image displayed on a screen (image rotation information), in units of 90 degrees, is added to the digital image, according to an attitude of the image pickup apparatus at the time of photographing.

For example, in Japanese Patent Laid-Open Publication No. 2000-312329, when a digital image (image data) having image rotation information added thereto is displayed, the digital image is rotated, by taking an attitude of a display section into account, in units of 90 degrees, for display according to the image rotation information, such that the image is in its normal position.

By the way, image rotation information unintended by a user is sometimes added to image data depending on the attitude of the image pickup apparatus at the time of photographing, e.g. when the photographing is performed with the image pickup apparatus facing almost upward or downward.

In Japanese Patent Laid-Open Publication No. 2000-312329, described above, when the user is about to view image data, to which image rotation information unintended by a user is added, in a desired orientation, the user is required to perform various operations, which costs the user much time and labor.

SUMMARY OF THE INVENTION

The present invention provides an image display device capable of saving time and effort required for viewing image data, to which image rotation information unintended by a user is added, in a desired orientation, a method of controlling the image display device, and a storage medium.

In a first aspect of the present invention, there is provided an image display device that displays an image in an image display area, comprising a detection unit configured to detect an attitude of the image display device, and a control unit configured to control a direction of display of the image based on rotation information added to the image and the attitude of the image display device, detected by the detection unit, wherein when the image display device is rotated from a state where a long side of the image displayed in the image display area and a long side of the image display area do not match each other, the control unit rotates the image displayed in the image display area such that the long side of the image and the long side of the image display area match each other, and wherein when the image display device is rotated from a state where the image is displayed in the image display area such that the long side of the image and the long side of the image display area match each other, the control unit restricts rotation of the image displayed in the image display area.

In a second aspect of the present invention, there is provided a method of controlling an image display device that displays an image in an image display area, comprising detecting an attitude of the image display device, and controlling a direction of display of the image based on rotation information added to the image and the detected attitude of the image display device, wherein said controlling includes, when the image display device is rotated from a state where a long side of the image displayed in the image display area and a long side of the image display area do not match each other, rotating the image displayed in the image display area such that the long side of the image and the long side of the image display area match each other, and when the image display device is rotated from a state where the image is displayed in the image display area such that the long side of the image and the long side of the image display area match each other, restricting rotation of the image displayed in the image display area.

In a third aspect of the present invention, there is provided non-transitory computer-readable storage medium storing a computer-executable program for causing a computer to execute a method of controlling an image display device that displays an image in an image display area, wherein the method comprises detecting an attitude of the image display device, and controlling a direction of display of the image based on rotation information added to the image and the detected attitude of the image display device, wherein said controlling includes, when the image display device is rotated from a state where a long side of the image displayed in the image display area and a long side of the image display area do not match each other, rotating the image displayed in the image display area such that the long side of the image and the long side of the image display area match each other, and when the image display device is rotated from a state where the image is displayed in the image display area such that the long side of the image and the long side of the image display area match each other, restricting rotation of the image displayed in the image display area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B are diagrams useful in explaining image display performed in the image playback process described with reference to FIG. 3, in which FIG. 5A shows an example of image display performed in a case where rotation information unintended by the user is added to image data when photographing is performed with the camera facing upward, and FIG. 5B shows another example of image display performed in the case where the rotation information unintended by the user is added to the image data when photographing is performed with the camera facing upward.

DESCRIPTION OF THE EMBODIMENTS

Various exemplary embodiments, features, and aspects of the invention will be described in detail below with reference to the drawings.

Figure 1:
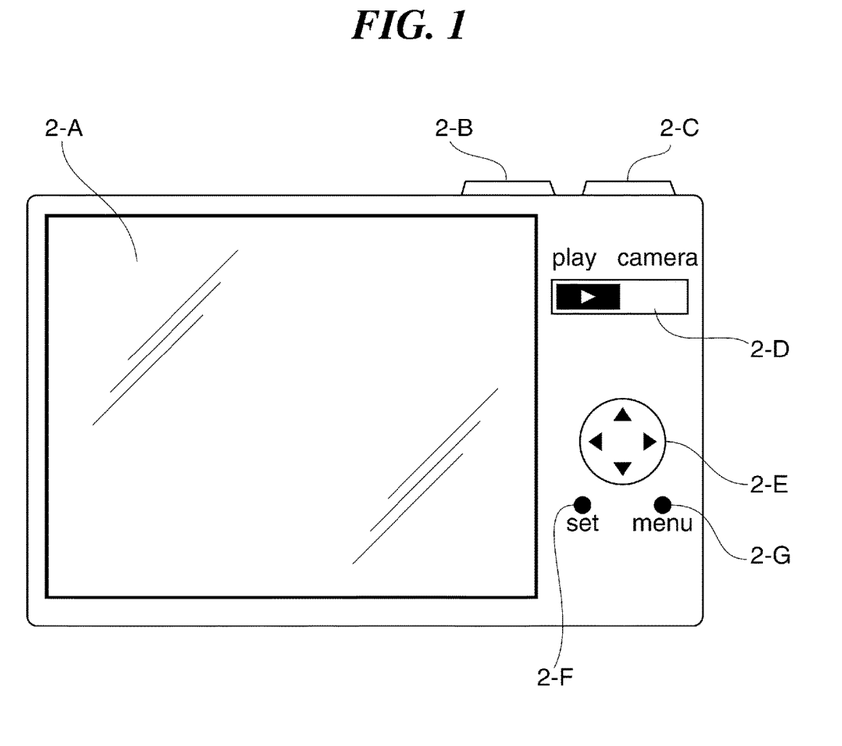
FIG. 1 is a diagram of an example of a camera as an image pickup apparatus including an image display device according to a first embodiment of the present invention, as viewed from the rear thereof.

FIG. 1 is a diagram of an image pickup apparatus including an image display device according to a first embodiment of the present invention, as viewed from the rear thereof.

The image pickup apparatus shown in FIG. 1 is e.g. a digital camera (hereinafter simply referred to as the "camera"), which is capable of recording and playing back image data obtained through photographing an object. The camera includes a photographing mode and a playback mode.

Note that although it is assumed here that image data is recorded by the camera e.g. in a image file with an aspect ratio of 4:3 in the JPEG format, image data may be recorded in an uncompressed format or the like. Further, the aspect ratio of the image file is not limited to 4:3.

A liquid crystal display (LCD) 2-A, which is a display section, is disposed on the rear surface of a camera housing, and an image (photographed image) to be checked by a user before photographing is displayed on the LCD 2-A.

Further, when image data recorded e.g. in a memory is played back, an image corresponding to the image data is displayed on the LCD 2-A as a playback image.

As shown in FIG. 1, a still image photographing button 2-B and a moving image photographing button 2-C are arranged on the top surface of the camera housing. When the user depresses the still image photographing button 2-B, still image photographing is started. Further, when the user depresses the moving image photographing button 2-C, moving image photographing is started.

On the rear surface of the camera housing, there are arranged a mode changeover switch 2-D, an operation button 2-E, a set button 2-F, and a menu button 2-G, on the left side of the LCD 2-A.

The mode changeover switch 2-D is used to switch between the playback mode (play), the photographing mode (camera), and the power-off of the camera. The operation button 2-E is used to operate the camera.

The operation button 2-E comprises four buttons, i.e. up, down, left, and right buttons. By using the operation button 2-E, the set button 2-F, and the menu button 2-G, it is possible to perform a photographing operation, a playback operation, and a camera settings configuration operation. If the mode changeover switch 2-D is set to a left position, as viewed in FIG. 1, the camera is set to the playback mode, whereas if the mode changeover switch 2-D is set to a right position, as viewed in FIG. 1, the camera is set to the photographing mode. Further, if the mode changeover switch 2-D is set to a center position, as viewed in FIG. 1, the camera is powered off.

Figure 2:
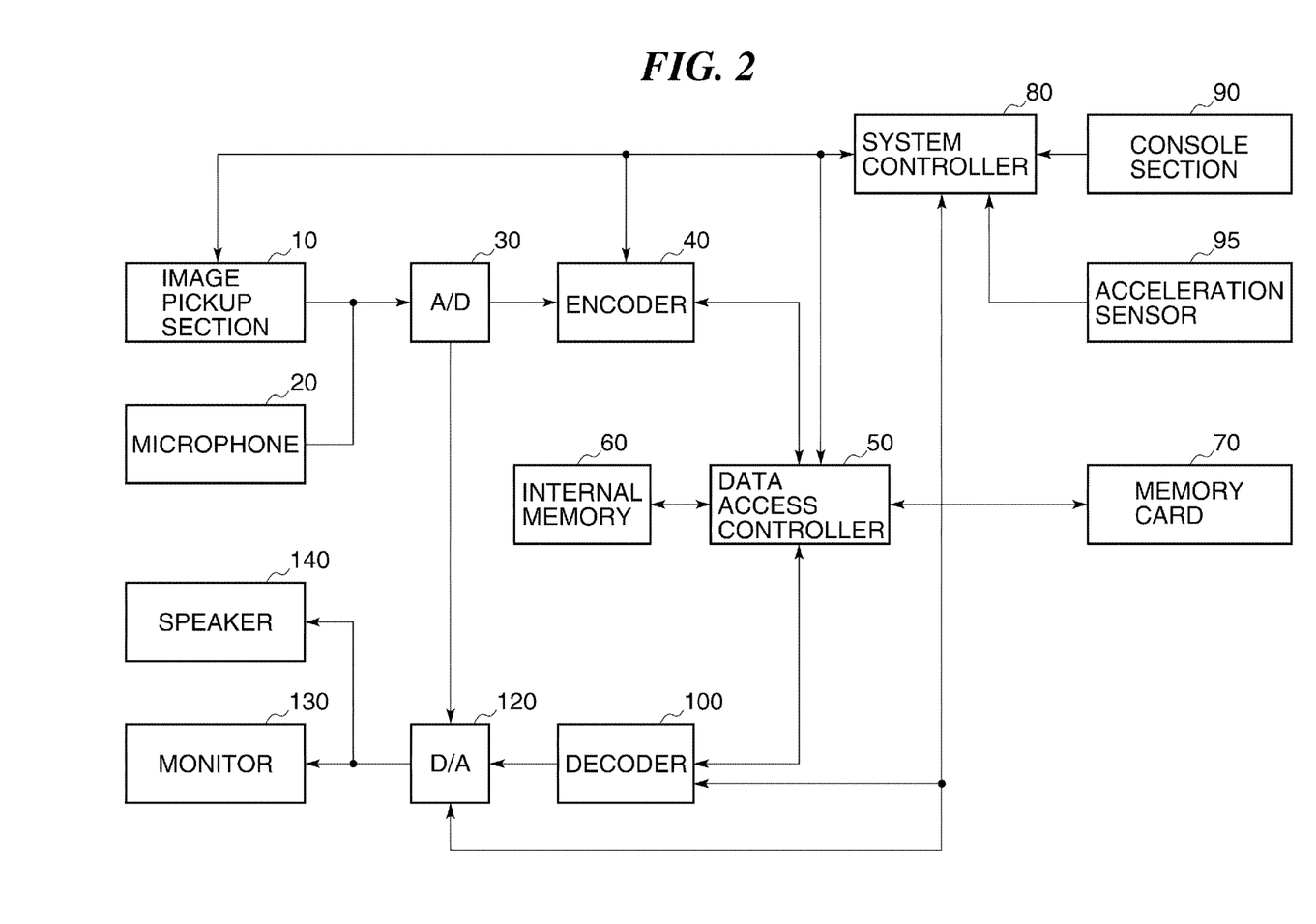
FIG. 2 is a block diagram of the image pickup apparatus shown in FIG. 1.

FIG. 2 is a block diagram of the camera as the image pickup apparatus shown in FIG. 1.

Referring to FIG. 2, the camera includes an image pickup section 10. The image pickup section 10 comprises a photographic lens, a shutter and diaphragm, and an image pickup device, such as a CCD, for example, (none of which are shown) and is equipped with an autofocus function.

The image pickup device delivers an electric signal (analog signal) according to an optical image (object image) incident through the photographic lens. Note that operation information concerning the operation of the image pickup section 10 is sent to a system controller 80.

The analog signal is sent to an analog-to-digital converter 30, and is converted to a digital signal (image signal) by the analog-to-digital converter 30. The digital signal is sent to an encoder 40. Note that when the camera is in the photographing mode, the digital signal is sent also to a digital-to-analog converter 120 in order to display an image according to the digital signal on a monitor 130 (the LCD 2-A appearing in FIG. 1).

The encoder 40 compresses and encodes the digital signal to form a compressed image data. In the illustrated example, the encoder 40 compresses the digital signal by a JPEG compression method, and then transmits the compressed image data to the system controller 80 and a data access controller 50 under the control of the system controller 80.

The data access controller 50 is used for transmitting and receiving image data and the like to and from a memory card 70 and an internal memory 60. The data access controller 50 writes compressed image data in the memory card 70 or the internal memory 60 under the control of the system controller 80. Further, the data access controller 50 reads the compressed image data from the memory card 70 or the internal memory 60 under the control of the system controller 80.

The internal memory 60 includes a read only memory (ROM) and a writable memory (RAM), neither of which is shown. The read only memory stores control programs, and the writable memory is used as a temporary storage area. Note that the compressed image data is temporarily recorded in the writable memory.

The memory card 70 is an external recording medium which is removably mounted on the camera, and digital data, such as compressed image data, is recorded therein as a file.

The system controller 80 includes a microcomputer and not only controls the whole camera but also performs signal processing. Note that a control program for controlling the whole camera is recorded in the system controller 80.

A console section 90 is connected to the system controller 80. The console section 90 corresponds to the still image photographing button 2-B, the moving image photographing button 2-C, the mode changeover switch 2-D, the operation button 2-E, the set button 2-F, and the menu button 2-G, which appear in FIG. 1. When the user operates the console section 90, operation information corresponding to the operation is sent to the system controller 80. The system controller 80 executes processing according to the operation information.

An acceleration sensor 95 detects an attitude of the camera, and sends a result of the detection to the system controller 80. Note that the acceleration sensor 95 detects e.g. whether the camera is in landscape position or portrait orientation.

A decoder 100 is used for decoding compressed image data. When the camera is in the playback mode, the decoder 100 receives compressed image data from the memory card 70 via the data access controller 50, decodes the compressed image data, and sends the decoded compressed image data to the digital-to-analog converter 120 as decoded image data.

The digital-to-analog converter 120 converts image data received from the analog-to-digital converter 30 or the decoder 100 to an analog signal, and sends the analog signal to the monitor 130, whereby an image based on the image data is displayed on the monitor 130. Note that if required, the digital-to-analog converter 120 superimposes text data sent from the system controller 80 on image data, and then converts the resulting data to an analog signal.

As shown in FIG. 2, a microphone 20 is connected to the analog-to-digital converter 30. The microphone 20 converts sound, such as voice, to an electric signal, and delivers the electric signal to the analog-to-digital converter 30. Note that the monitor 130 has an aspect ratio of 4:3, and a speaker 140 for outputting voice according to audio data including voice data added to image data is connected to the digital-to-analog converter 120.

Referring to FIG. 2, the camera includes the photographing mode for recording compressed image data in the memory card 70 and the playback mode for playing back compressed image data recorded in the memory card 70. Now, let it be assumed that the playback mode is set by the mode changeover switch 2-D appearing in FIG. 1.

Figure 3:
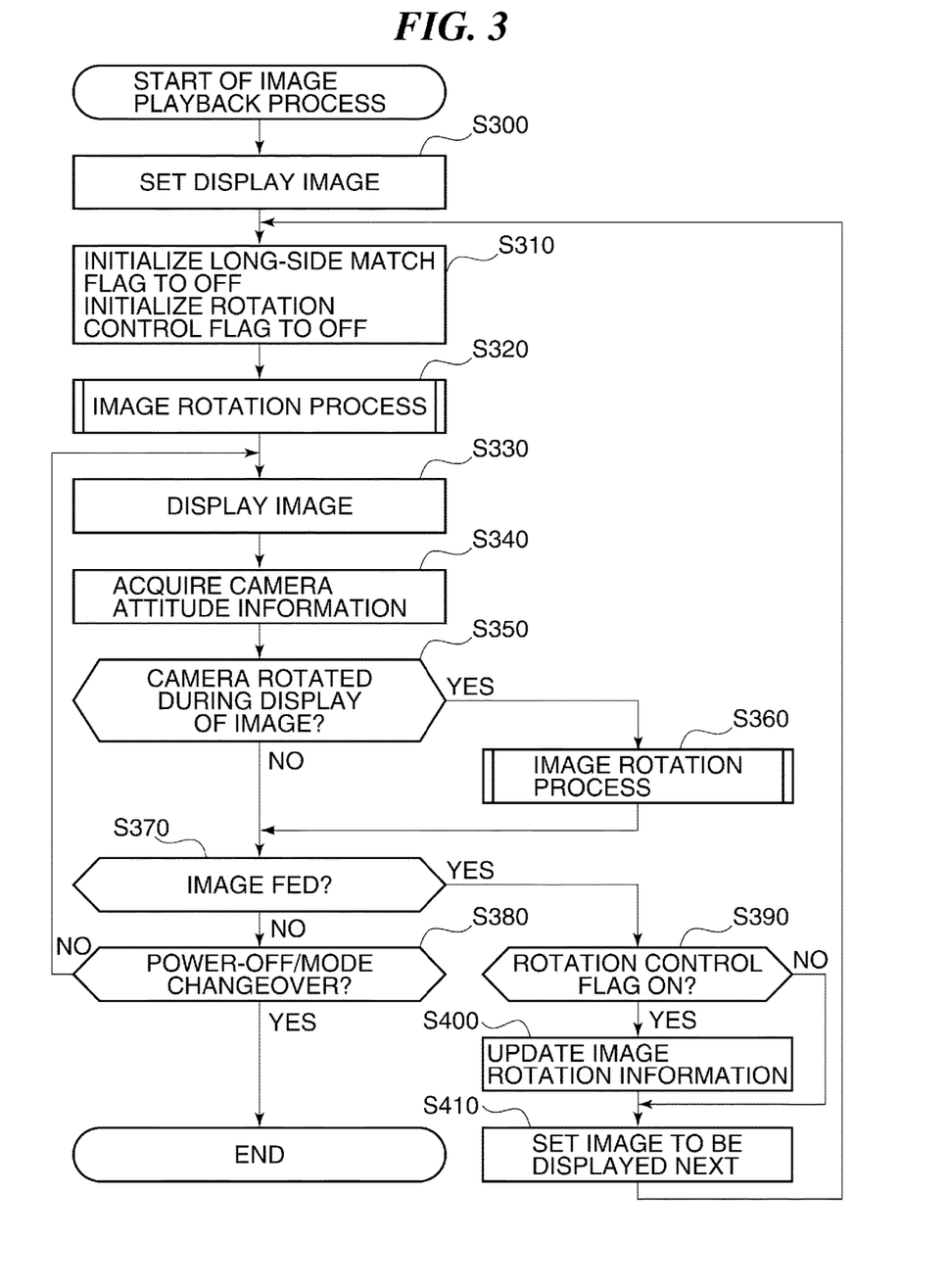
FIG. 3 is a flowchart of an image playback process executed by the camera shown in FIG. 2 when in a playback mode.

FIG. 3 is a flowchart of an image playback process executed by the camera shown in FIG. 2 when in the playback mode.

Although in the illustrated example, the image playback process shown in the FIG. 3 is executed according to the control program recorded in the system controller 80, the control program may be recorded in the memory card 70 and loaded into the system controller 80.

The control program may be downloaded via a network, though not shown, and executed.

When the image playback process is started, the system controller 80 sets an image file to be displayed (step S300). Here, the system controller 80 selects, for example, the oldest of all image files recorded in the memory card 70. Note that the system controller 80 may be configured to select an image file being displayed before termination of the playback mode last time.

Then, the system controller 80 initializes a long-side match flag and a rotation control flag to off (step S310). Here, when the long-side match flag is on, it indicates that an image is displayed on the monitor 130 in a state where the long side of the monitor 130 and that of the image match each other. Further, when the rotation control flag is on, it indicates that rotation processing of image data of the image file has not been executed when the monitor 130 (i.e. the camera) has been rotated, as will be described hereinafter.

Next, the system controller 80 performs an image rotation process on the set (i.e. selected) image file (step S320).

Figure 4:
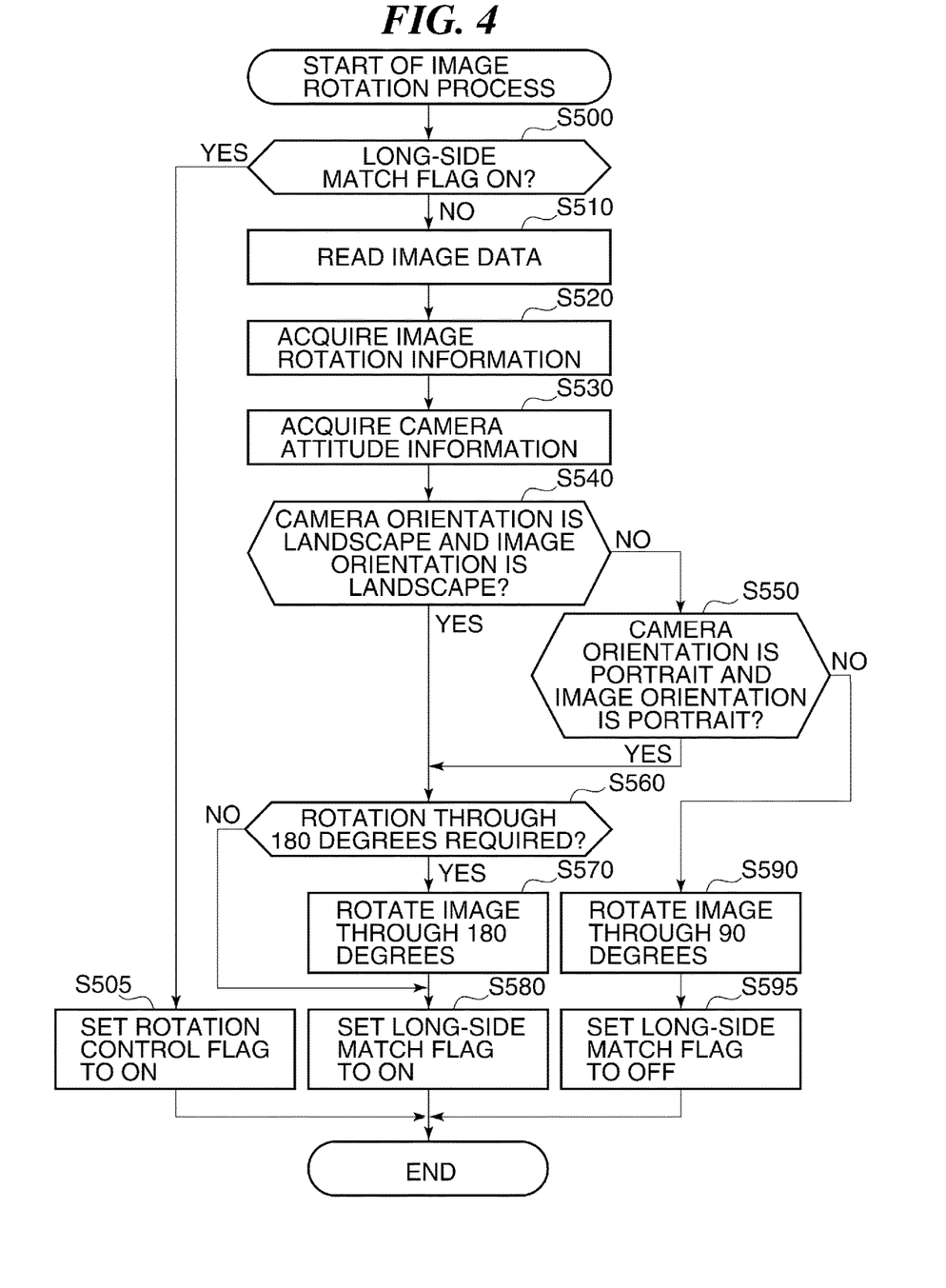
FIG. 4 is a flowchart of an image rotation process executed in a step in the image playback process shown in FIG. 3.

FIG. 4 is a flowchart of the image rotation process executed in the step S320 shown in FIG. 3.

When the image rotation process is started, first, the system controller 80 determines whether or not the long-side match flag is on (step S500). If the long-side match flag is on (YES to the step S500), the system controller 80 sets the rotation control flag to on (step S505), and terminates the image rotation process.

On the other hand, if the long-side match flag is off (NO to the step S500), the system controller 80 causes the data access controller 50 to read image data from the set image file into the internal memory 60 (step S510).

Note that when the image rotation process is first performed after the playback mode has been set, the long-side match flag is necessarily off, and hence the system controller 80 executes the step S510. Further, the image data has image rotation information added thereto which indicates an orientation of an image on the screen (i.e. a rotation angle of the image with respect to the monitor 130).

Next, the system controller 80 causes the data access controller 50 to acquire the image rotation information from the image data stored in the internal memory 60 (step S520). Here, information (Orientation Tag) defined by Exif is used as the image rotation information.

Subsequently, the system controller 80 acquires an attitude detection result indicative of an attitude of the camera from the acceleration sensor 95 (step S530). Then, the system controller 80 determines based on the image rotation information and the attitude detection result (also referred to as the "attitude information") whether or not the orientation of the image is landscape (which means that the long side of the image is horizontal) and at the same time the orientation of the camera is landscape (which means that the long side of the camera is horizontal) (step S540).

If both of the orientations of the image and the camera are landscape (YES to the step S540), the system controller 80 determines whether or not it is necessary to rotate the image through 180 degrees (step S560). Although both of the orientations of the image and the camera being landscape indicates the state where the long sides (which are predetermined sides) of the monitor 130 and the image match each other, to display the image on the monitor 130 in its normal position, it is sometimes necessary to rotate the image through 180 degrees. That is, depending on the attitude of the camera, it is sometimes necessary to rotate the image through 180 degrees.

If it is determined that it is necessary to rotate the image through 180 degrees (YES to the step S560), the system controller 80 performs rotation processing for rotating the image through 180 degrees (step S570), and writes the resulting image data over the image data recorded in the internal memory 60. Then, the system controller 80 sets the long-side match flag to on (step S580), and terminates the image rotation process.

On the other hand, if it is determined that it is not necessary to rotate the image through 180 degrees (NO to the step S560), the system controller 80 proceeds to the step S580 to set the long-side match flag to on.

If at least one of the orientations of the image and the camera is not landscape (NO to the step S540), the system controller 80 determines based on the image rotation information and the attitude detection result whether or not the orientation of the image is portrait and at the same time the orientation of the camera is portrait (step S550).

If both of the orientations of the image and the camera are portrait (YES to the step S550), the system controller 80 determines that the long side of the monitor 130 and that of the image match each other, and proceeds to the step S560, wherein the system controller 80 determines whether or not it is necessary to rotate the image through 180 degrees in order to display the image on the monitor 130 in its normal position.

If at least one of the orientations of the image and the camera is not portrait (NO to the step S550), to display the image in its normal position, the system controller 80 performs processing for rotating the image (i.e. image data) recorded in the internal memory 60 90 degrees (step S590).

In doing this, the system controller 80 determines, based on the attitude detection result and the image rotation information, whether to rotate the image clockwise or counterclockwise. Then, the system controller 80 writes the image data having been rotated 90 degrees over the image data recorded in the internal memory 60.

Next, the system controller 80 sets the long-side match flag to off (step S595), and terminates the image rotation process.

Referring again to FIG. 3, after executing the image rotation process as described above, the system controller 80 causes the digital-to-analog converter 120 to display an image based on the image data on the monitor 130 (step S330).

At this time, when the image is displayed in a state where the long sides of the monitor 130 and the image do not match each other or when the aspect ratios of the monitor 130 and the image do not match each other, the system controller 80 displays the image with black bands added thereto such that the entire image is displayed.

Next, the system controller 80 acquires the current camera attitude information from the acceleration sensor 95 (step S340). Then, the system controller 80 determines based on the current camera attitude information whether or not the camera has been rotated during display of the image (step S350).

More specifically, the system controller 80 determines where the camera has been rotated, based on a change between the immediately precedingly acquired attitude information and the current attitude information.

If it is determined that the camera has not been rotated during display of the image (NO to the step S350), the system controller 80 determines whether or not the user has performed an image feed operation (specific operation) (step S370). The image feed operation is performed using the operation button 2-E shown in FIG. 1.

When the user operates a right key of the operation button 2-E, an instruction for displaying a next image is sent to the system controller 80. When the user operates a left key of the operation button 2-E, an instruction for displaying the immediately preceding image is sent to the system controller 80.

If it is determined that the user has not performed an image feed operation (NO to the step S370), the system controller 80 determines whether or not the user has operated the mode changeover switch 2-D to thereby perform an operation for terminating the playback mode, i.e. a power-off operation or a mode changeover operation (step S380).

If the user has performed the power-off operation or the mode changeover operation (YES to the step S380), the system controller 80 terminates the image playback process.

On the other hand, if the user has not performed the power-off operation or the mode changeover operation (NO to the step S380), the system controller 80 returns to the step S330.

If it is determined that the user has performed an image feed operation (YES to the step S370), the system controller 80 determines whether or not the rotation control flag is on (step S390). If the rotation control flag is on (YES to the step S390), the system controller 80 determines that the camera has been rotated while displaying the image on the monitor 130 in the state of the long sides of the monitor 130 and the image matching each other, and changes the image rotation information based on the current display state of the image and current camera attitude information such that the current position of the image displayed on the monitor 130 is its normal position (step S400).

Next, the system controller 80 sets an image file to be displayed next (step S410), and then returns to the step S310.

Note that if the rotation control flag is off (NO to the step S390), the system controller 80 directly proceeds to the step S410.

If it is determined that the camera has been rotated during display of the image (YES to the step S350), the system controller 80 performs the image rotation process again (step S360). The image rotation process performed in the step S360 is the same as the image rotation process described with reference to FIG. 4.

In this case, if the long side of the monitor 130 and that of the image (predetermined side) match each other, it is determined in the step S500 that the long-side match flag (first flag) is on. This causes the system controller 80 to set the rotation control flag (second flag) to on without going through the other steps, and then terminate the image rotation process.

In other words, if the long side of the monitor 130 and that of the image (predetermined side) match each other, the long-side match flag (first flag) is set to on, and accordingly, the system controller 80 inhibits or restricts the rotation processing of the image when the monitor 130 (camera) is rotated. Further, at this time, the rotation control flag is set to on, and hence if the rotation control flag is on, it indicates that rotation processing of the image data has not been executed when the monitor 130 (camera) has been rotated.

As described hereinabove, the system controller 80 repeatedly executes the steps S310 to S410 to perform image display and image feeding.

Figure 5A:
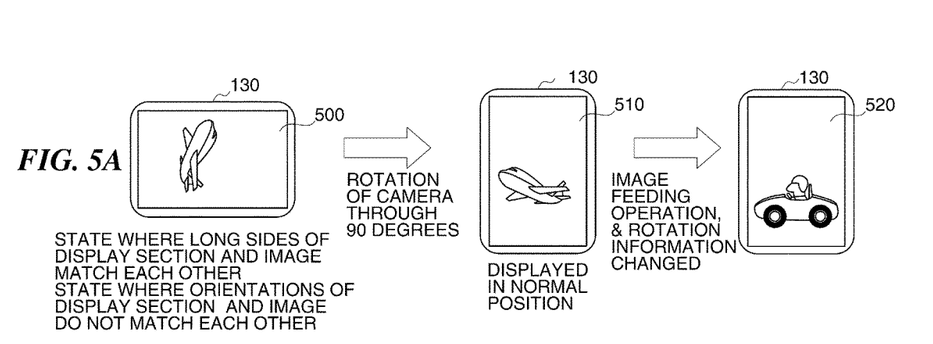
Figure 5B:
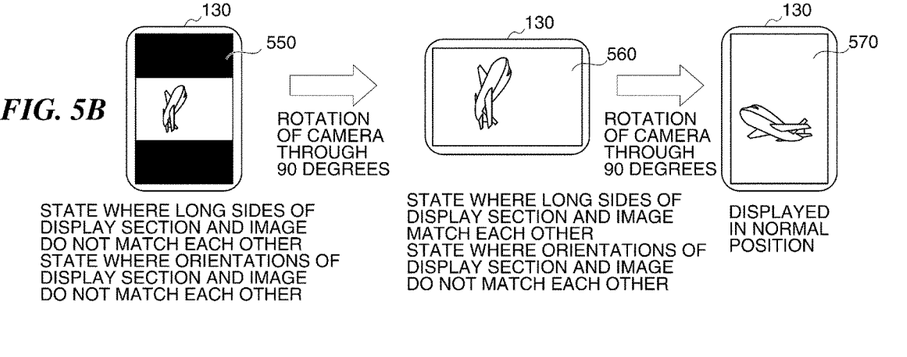

FIGS. 5A and 5B are diagrams useful in explaining the image display performed in the image playback process described with reference to FIG. 3, in which FIG. 5A shows an example of image display performed in a case where rotation information unintended by the user is added to image data when photographing is performed with the camera facing upward, and FIG. 5B shows another example of image display performed in the case where the rotation information unintended by the user is added to the image data when photographing is performed with the camera facing upward.

Now, let it be assumed that as the image rotation information, 0 degrees, which indicate a rotation angle of the image with respect to the monitor 130 in landscape position, are added to the image data. When an image based on the image data is displayed on the monitor 130 in a state where the camera is in landscape position, it is determined in the step S500 in the image rotation process described with reference to FIG. 4 that the long-side match flag is off, and further, since the image rotation information is 0 degrees, it is determined in the step S540 that both the orientations of the image and the camera are landscape.

Further, since the long sides of the monitor 130 and the image 500 match each other, the long-side match flag is set to on in the step S580. Then, in the step S330 in the image playback process in FIG. 3, the image 500 appearing in FIG. 5A is displayed on the monitor 130.

Although in FIG. 5A, the long sides of the image 500 and the monitor 130 match each other, the orientations thereof do not match each other. In such image display, since it is difficult for the user to visually recognize the image, the user often rotates the camera. Now, let it be assumed that the user rotates the camera counterclockwise 90 degrees, as viewed in FIG. 5A.

When the user has rotated the camera counterclockwise 90 degrees, the system controller 80 determines in the step S350 in the image playback process in FIG. 3 that the camera has been rotated, and performs the image rotation process in the step S360 in the same. In this case, it is determined in the step S500 shown in FIG. 4 the long-side match flag is on, and hence the system controller 80 sets the rotation control flag to on in the step S505 without going through the other steps in the image rotation process.

When the camera has been rotated in the state of the long sides of the monitor 130 and the image matching each other, the system controller 80 maintains the display state of the image. This causes an image 510 to be displayed on the monitor 130 as illustrated in FIG. 5A.

That is, the image 510 is displayed in its normal position on the monitor 130, and is displayed in a state that matches a user's intention.

Now, let it be assumed that the user has performed an image feed operation. In this case, the system controller 80 determines in the step S370 in the image playback process in FIG. 3 that an image feed operation has been performed, and further determines in the step S390 in the same that the rotation control flag is on.

Then, in the step S400, the system controller 80 updates the image rotation information based on the current display state of the image and the current camera attitude information such that the current position of the image displayed on the monitor 130 is its normal position, and then displays a next image 520. Note that in the present example, the rotation processing of the image data has not been executed as described above, and hence the image rotation information is not changed. As a consequence, when the image based on the image data is displayed next, it is displayed in its normal position.

Next, let it be assumed that the camera, i.e. the monitor 130 is in portrait position. When the image based on the image data is displayed on the monitor 130 by holding the camera in portrait position, it is determined in the step S500 in the image rotation process described with reference to FIG. 4 that the long-side match flag is off, and since the image rotation information is 0 degrees, it is determined in the step S40 in the same that at least one of the orientations of the image and the camera is not landscape.

Then, the system controller 80 determines in the step S550 that the orientation of the camera is portrait and the orientation of the image is landscape, and in the step S590, rotates the image 90 degrees. Further, the system controller 80 sets the long-side match flag to off in the step S595. Next, in the step S330 in the image playback process in FIG. 3, the system controller 80 displays an image 550 shown in FIG. 5B on the monitor 130.

The image 550 is shown in FIG. 5B in a state where the long sides of the monitor 130 and the image 550 do not match each other and also the orientations thereof do not match each other. In this case, black bands are added to the image 550, as shown in FIG. 5B.

Now, let it be assumed here that the user rotates the camera counterclockwise 90 degrees, as viewed in FIG. 5B. When the user has rotated the camera counterclockwise 90 degrees, the system controller 80 determines in the step S350 in the image playback process in FIG. 3 that the camera has been rotated, and performs the image rotation process in the step S360 of the same.

In this case, it is determined in the step S500 in the image rotation process in FIG. 4 that the long-side match flag is off, and hence in the step S540 of the same, the system controller 80 determines whether or not the orientations of the camera and the image are landscape.

In this example, since the orientations of the camera and the image are both landscape, the system controller 80 determines in the step S560 in the image rotation process in FIG. 4 whether or not it is necessary to rotate the image through 180 degrees.

In the present case, since the long sides of the monitor 130 and the image 500 match each other, irrespective of the answer to the question in the step S560 in the image rotation process in FIG. 4, the system controller 80 sets the long-side match flag to on in the step S580. Then, in the step S330 in the image playback process in FIG. 3, the system controller 80 displays an image 560 shown in FIG. 5B on the monitor 130.

In FIG. 5B, although the long sides of the image 560 and the monitor 130 match each other, the orientations thereof do not match each other. In such image display, since it is difficult for the user to visually recognize the image, the user rotates the camera again.

Assuming that the user rotates the camera counterclockwise 90 degrees, as viewed in FIG. 5B, the system controller 80 determines in the step S350 in the image playback process in FIG. 3 that the camera has been rotated, and performs the image rotation process in the step S360 of the same.

In this case, since the long-side match flag is on, the system controller 80 sets the rotation control flag to on in the step S505 in the image rotation process.

With this operation, as described hereinabove, when the camera has been rotated in the state of the long sides of the monitor 130 and the image matching each other, the system controller 80 maintains the display state of the image. This causes an image 570 to be displayed on the monitor 130. That is, the image 570 is displayed in its normal position on the monitor 130, and in other words, it is displayed in a state that matches a user's intention.

As described hereinabove, also when an image based on image data having image rotation information unintended by the user added thereto is displayed, it is possible to display the image in its normal position simply by rotating the camera, i.e. the monitor 130. Further, when an image feed operation is performed, it is possible to change the image rotation information.

As described heretofore, in the first embodiment of the present invention, during display of an image on the monitor 130 in a state where the long sides of the monitor 130 and the image match each other, even when the monitor 130 is rotated about an axis perpendicular to the screen, the image is held in the same display state without being rotated about the axis perpendicular to the screen.

As a consequence, simply by rotating the monitor 130, the user can display the image in its normal position in a state where the orientations of the monitor 130 and the image match each other.

Further, according to the first embodiment of the present invention, when an image feed operation is performed, the image rotation information added to the image data is changed or updated according to the display state of the image being displayed before the image feed operation. This makes it possible to display the image represented by the image data having been subjected to the image feed operation, based on the changed or updated image rotation information, from next time on.

Next, an image display device according to a second embodiment of the present invention will be described.

The following description will be given of a camera as an image pickup apparatus including the image display device according to the second embodiment, by way of example. Further, in the second embodiment, the camera has the same hardware configuration as that of the camera shown in FIGS. 1 and 2.

Figure 6:
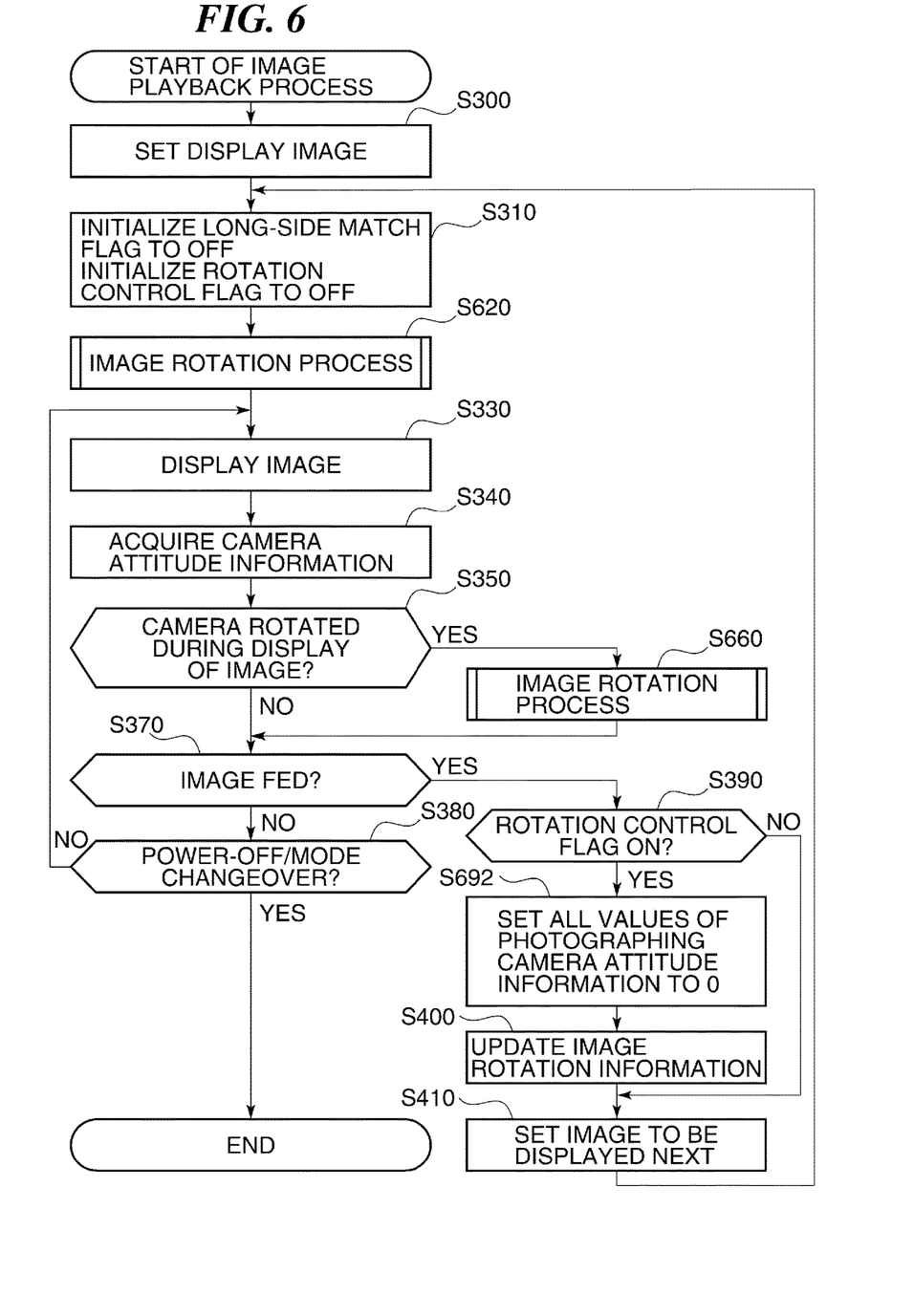
FIG. 6 is a flowchart of an image playback process executed by a camera as an image pickup apparatus including an image display device according to a second embodiment of the present invention when in the playback mode.

FIG. 6 is a flowchart of an image playback process executed by the camera including the image display device according to the second embodiment of the present invention when in the playback mode. The same steps in FIG. 6 as those in the FIG. 3 flowchart are denoted by the same step numbers, and description thereof is omitted.

As described with reference to FIG. 3, the system controller 80 sets the "long-side match flag and the rotation control flag to off in the step 310. Then, the system controller 80 proceeds to a step S620 to execute the image rotation process.

Figure 7:
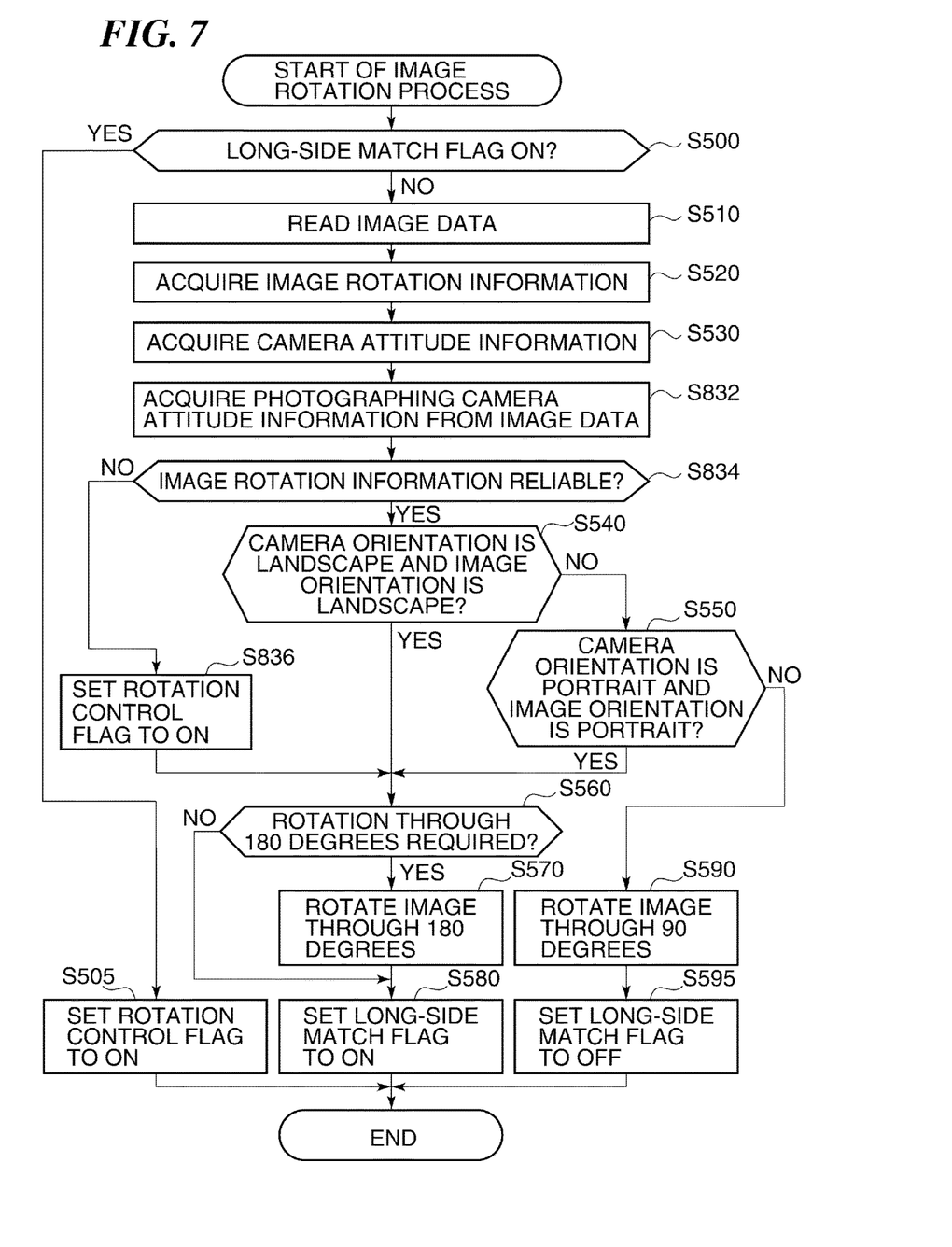
FIG. 7 is a flowchart of an image rotation process executed in a step in the image playback process shown in FIG. 6.

FIG. 7 is a flowchart of the image rotation process shown in FIG. 6. The same steps in FIG. 7 as those in FIG. 4 flowchart are denoted by the same step numbers, and description thereof is omitted.

As described hereinabove with reference to FIG. 4, in the step S530, the system controller 80 acquires an attitude detection result (attitude information), indicative of the attitude of the camera, from the acceleration sensor 95. Then, the system controller 80 reads camera attitude information at the time of photographing, associated with the read image data, from the internal memory 60 (step S832). Here, the camera attitude information obtained at the time of photographing is assumed to have been recorded in a header of the image file.

Figure 8:
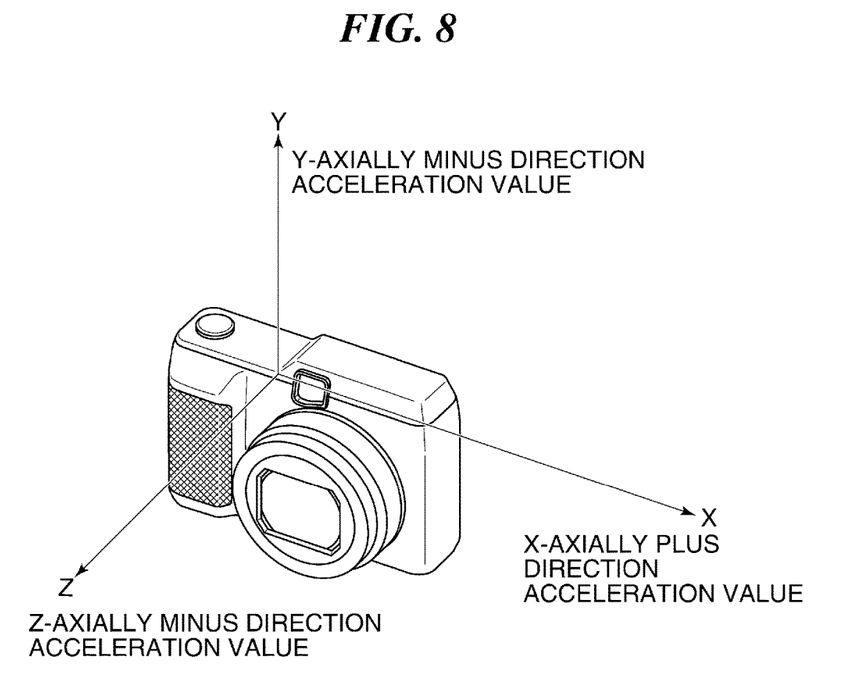
FIG. 8 is a perspective view useful in explaining camera attitude information obtained at the time of photographing, which is used in the second embodiment of the present invention.

FIG. 8 is a perspective view useful in explaining the camera attitude information at the time of photographing, which is used in the second embodiment.

FIG. 8 shows correspondence between the attitude of the camera and the axes of the acceleration sensor 95. The system controller 80 acquires the following first to third information as the camera attitude information at the time of photographing.

(1) X-axially plus direction acceleration value indicative of an inclination of the camera in a left-right direction (X-axially plus direction) (first information)

(2) Y-axially minus direction acceleration value indicative of an inclination of the camera in a vertical direction (Y-axially minus direction) (second information)

(3) Z-axially minus direction acceleration value indicative of the inclination of the camera in the front-rear direction (Z-axially minus direction) (third information)

In the example shown in FIG. 8, the camera is in the normal position. When the camera is in the normal position, the first to third information are as follows:

$$X\text{-axially plus direction acceleration value} = 0.0 \text{(first information)} \quad (1)$$

$$Y\text{-axially minus direction acceleration value} = 10.0 \text{ (second information)} \quad (2)$$

$$Z\text{-axially minus direction acceleration value} = 0.0 \text{ (third information)} \quad (3)$$

Thus, when the camera is in the normal position, only the Y-axially minus direction acceleration value associated with the Y-axis as the second information is 10.0, which is a value other than 0. This makes it possible for the system controller 80 to determine whether or not the camera is in the normal position. Further, the system controller 80 can determine an inclined state of the camera based on these three axis acceleration values.

Further, when the camera lens faces upward, the first to third information are as follows:

$$X\text{-axially plus direction acceleration value} = 0.0 \text{(first information)} \quad (1)$$

$$Y\text{-axially minus direction acceleration value} = 0.0 \text{(second information)} \quad (2)$$

$$Z\text{-axially minus direction acceleration value} = 10.0 \text{ (third information)} \quad (3)$$

Thus, when the camera lens faces upward, only the Z-axially minus direction acceleration value associated with the Z-axis as the third information is 10.0. This makes it possible for the system controller 80 to determine whether or not the camera lens faces upward. Note that in the present embodiment, the front facing orientation of the camera lens is the same as the front facing orientation of the monitor 130.

Further, when the camera lens faces downward, the first to third information are as follows:

$$X\text{-axially plus direction acceleration value} = 0.0 \text{(first information)} \quad (1)$$

$$Y\text{-axially minus direction acceleration value} = 0.0 \text{(second information)} \quad (2)$$

$$Z\text{-axially minus direction acceleration value} = -10.0 \text{ (third information)} \quad (3)$$

As described above, when the camera lens faces downward, only the Z-axially minus direction acceleration value associated with the Z-axis as the third information is −10.0. This makes it possible for the system controller 80 to determine whether or not the camera lens faces downward.

As described hereinabove, after acquisition of the camera attitude information at the time of photographing including the first to third information (hereinafter referred to as the "photographing camera attitude information"), the system controller 80 determines based on the photographing camera attitude information whether or not the image rotation information is reliable (step S834).

Here, when the orientation of the camera is within a range of maximum 20 degrees of inclination to an orientation in which the camera lens faces upward or downward, the system controller 80 determines that the image rotation information is not reliable.

Note that the system controller 80 may be configured to determine whether or not the image rotation information is reliable by using a criterion other than the above. For example, the system controller 80 may determine that image rotation information is not reliable when the camera is in a position inclined through an angle of approximately 45 degrees.

Further, when all the first to third information indicate 0 by being set to 0 in a step S692 in the image playback process, referred to hereinafter, the system controller 80 determines that image rotation information is reliable.

If it is determined that image rotation information added to the image data is reliable (YES to the step S834), the system controller 80 proceeds to the step S540, described with reference to FIG. 4.

On the other hand, if it determined that the image rotation information is not reliable (NO to the step S834), the system controller 80 sets the rotation control flag to on (step S836). That is, when the image rotation information is not reliable, the system controller 80 sets the rotation control flag to on in order to update the image rotation information in the step S400 of the image playback control process.

Referring again to FIG. 6, after execution of the image rotation process in the step S620 as described above, the system controller 80 proceeds to the step S330 to display the image based on the image data on the monitor 130.

If it is determined in the step S350 that the camera has been rotated during display of the image, the system controller 80 executes the image rotation process again (step S660). After that, the system controller 80 proceeds to the step S370.

Note that the image rotation process in the step S660 is the same as the image rotation process described with reference to FIG. 7.

When the system controller 80 determines in the step S370 that the image feed operation has been executed, if the rotation control flag is on (YES to the step S390), the system controller 80 sets all the first to third information of the photographing camera attitude information to 0 (step S692). Then, the system controller 80 proceeds to the step S400.

When all the first to third information of the photographing camera attitude information indicate 0, it means that the image rotation information has been updated in the step S400 of the image playback process, the system controller 80 determines in the step S834 in the image rotation process that the image rotation information is reliable.

Therefore, when displaying the image based on the image data next time on, the system controller 80 determines that the image rotation information added to the image data is reliable.

Although in this example, when the rotation control flag is on, by setting all the first to third information to 0, the system controller 80 is caused to determine that the image rotation information is reliable, the reliability of the image rotation information may be determined by another method.

As described heretofore, in the second embodiment of the present invention, if image rotation information added to image data is not reliable, the rotation control flag is set to on to cause the long sides of the monitor 130 and an image based on the image data to match each other, and then the image is displayed on the monitor 130. Further, whenever the rotation control flag is on, it is caused to be always determined that image rotation information is reliable.

As a consequence, in the second embodiment of the present invention, if the image rotation information is not reliable, the image is displayed by causing the long sides of the monitor 130 and the image to match each other, so that the image is displayed with no black bands from the beginning, whereby the user can shift a display to a desired state by a smaller number of rotation operations.

Further, as to image data of which the image rotation information has been updated, it is possible to always display an image based on the image data in its normal position when the image is displayed next time.

Although in the above-described second embodiment, photographing camera attitude information is used to determine the reliability of image rotation information, this is not limitative, but for example, reliability information indicative of the reliability of the image rotation information may be added to image data during photographing of an image such that the reliability of the image rotation information may be determined based on the reliability information during playback of the image.

Next, an image display device according to a third embodiment of the present invention will be described.

The following description will be given of a camera as an image pickup apparatus including the image display device according to the third embodiment, by way of example. Further, in the third embodiment, the camera has the same hardware configuration as that of the camera shown in FIGS. 1 and 2.

Although in the third embodiment, an image playback process is executed according to the flowchart described with reference to FIG. 3, an image rotation process is different from the image rotation process described with reference to FIG. 4.

Figure 9:
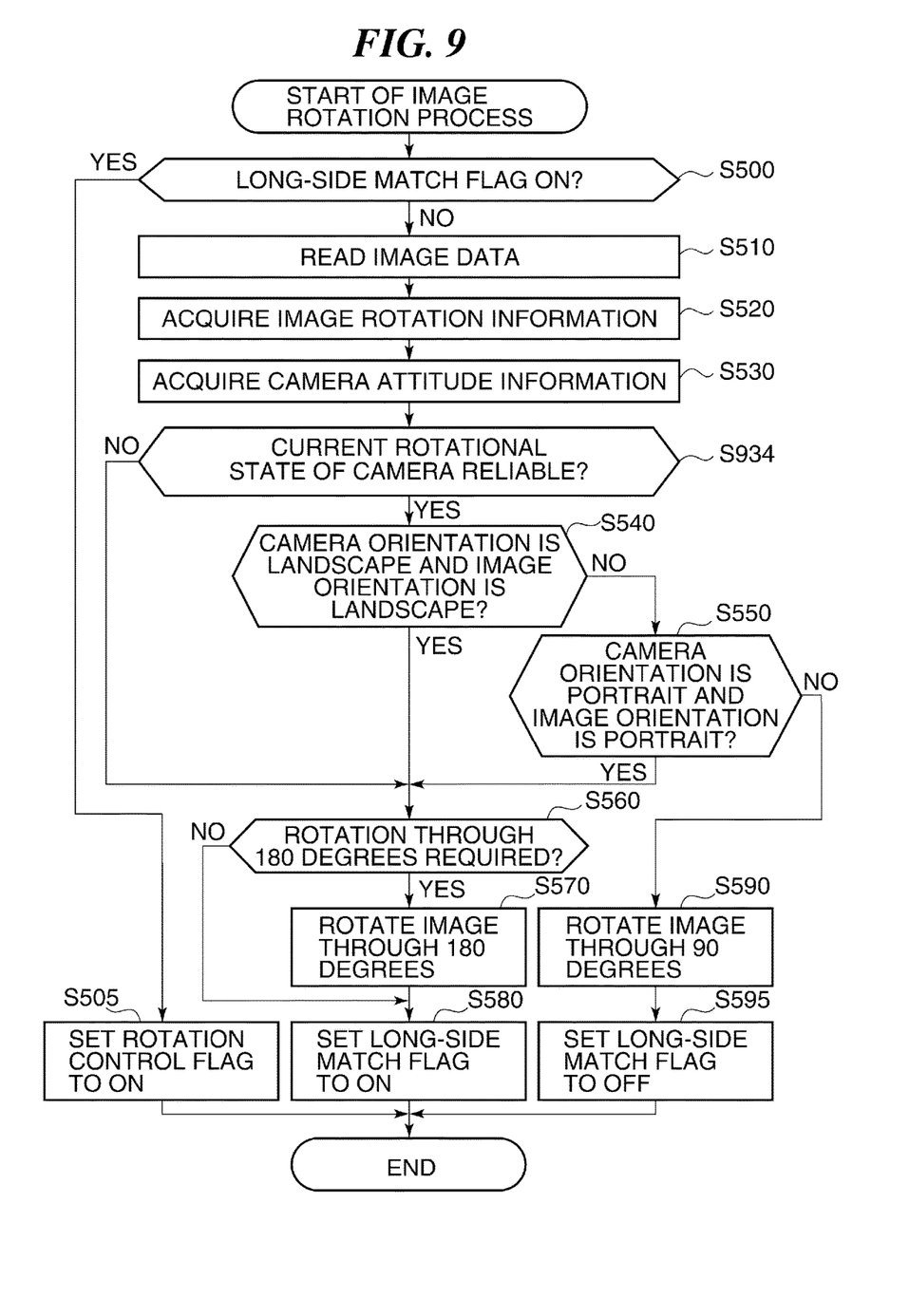
FIG. 9 is a flowchart of an image rotation process executed by a camera as an image pickup apparatus including an image display device according to a third embodiment of the present invention.

FIG. 9 is a flowchart of the image rotation process executed by the camera including the image display device according to the third embodiment. The same steps in FIG. 9 as those in FIG. 4 flowchart are denoted by the same step numbers, and description thereof is omitted.

As described hereinabove with reference to FIG. 4, in the step S530, the system controller 80 acquires an attitude detection result (attitude information), indicative of the attitude of the camera, from the acceleration sensor 95. Then, the system controller 80 determines based on the attitude information of the camera whether or not the rotational state of the camera is reliable (step S934).

In this example, it is assumed that the system controller 80 acquires a three-axis detection result as the attitude information of the camera from the acceleration sensor 95. The term "three-axis detection result" refers to the first to third information, described with reference to FIG. 8.

When the orientation of the camera is within a range of maximum 20 degrees of inclination to an orientation in which the camera lens faces upward or downward, the system controller 80 determines based on the attitude information of the camera that image rotation information is not reliable.

If it is determined that the rotational state of the camera is reliable (YES to the step S934), the system controller 80 proceeds to the step S540, whereas if it is determined that the rotational state of the camera is not reliable (NO to the step S934), the system controller 80 proceeds to the step S560.

As described heretofore, in the third embodiment of the present invention, when the rotational state of the camera, i.e. the monitor 130 is not reliable, the system controller 80 causes the long sides of the monitor 130 and an image to match each other (i.e. rotate the image), and displays the image on the monitor 130.

This causes the image to be displayed with no black bands from the beginning, whereby the user can shift a display to a desired state by a smaller number of rotation operations.

Although in the above-described first to third embodiments, the description has been given of the case where the image display device is included in the digital camera, the image display device may be included in an apparatus other than the camera. For example, the above-described image display device may be included in a tablet PC or a smartphone.

Further, although in the above-described embodiments, image rotation information is updated during an image feed operation, the image rotation information may be updated when performing any of operations including an image enlarging and display operation, an image property display operation, an even of no operation over a predetermined time period, and an operation for finalizing an orientation of display. Further, when the system controller 80 is restricting the rotation of the image, if the attitude of the image display device has been maintained for a predetermined time period, the system controller 80 may change the image rotation information.

Furthermore, although in the above-described embodiments, attitude information of a camera is acquired using the acceleration sensor, the attitude information of the camera may be acquired using another suitable sensor. In addition, although in the above-described embodiments, the description has been given of the case where still image data is handled as image data, moving image data as well can be handled as image data in the same manner.

Further, although in the above-described embodiments, the description has been given assuming that the predetermined sides are the long side of an image and the long side of the display section, this is not limitative, but even if the predetermined sides are the short side of the image and the short side of the display section, provided that the image pickup apparatus is similarly controlled, the image can be easily displayed in an orientation desired by the user, irrespective of the attitude of the image pickup apparatus at the time of photographing.

As is clear from the above description, in the example illustrated in FIG. 2, at least the system controller 80, the acceleration sensor 95, the data access controller 50, the internal memory 60, the decoder 100, the digital-to-analog converter 120, and the monitor 130 form the image display device.

Further, the system controller 80 functions as a rotation processing unit, a control unit, a rotation information change unit, and a reliability determination unit.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-184137 filed Aug. 23, 2012, which is hereby incorporated by reference herein in its entirety.

What is claimed is:

1. An image display device that displays an image in an image display area, comprising:
    a detection unit configured to detect an attitude of the image display device; and
    a control unit configured to control a direction of display of the image based on rotation information added to the image and the attitude of the image display device, detected by said detection unit, wherein the rotation information added to the image indicates an orientation of an image on the screen,
    wherein if the detection unit detects a first rotation of the image display device from a state where a long side of the image displayed in the image display area and a long side of the image display area do not match each other, so that longitudinal sides and lateral sides of the image display device are inverted, said control unit automatically rotates the image displayed in the image display area such that the long side of the image and the long side of the image display area match each other,
    wherein if the detection unit detects a second rotation of the image display device from a state where the image is displayed in the image display area such that the long side of the image and the long side of the image display area match each other, so that the longitudinal sides and the lateral sides of the image display device are inverted, said control unit automatically restricts rotation of the image displayed in the image display area, and
    wherein if a predetermined condition has occurred while said control unit is restricting the rotation of the image, the control unit changes the rotation information added to the image based on a current display state of the image without an explicit changing operation from a user.

2. The image display device according to claim 1, wherein the predetermined condition comprises at least one of an image feed operation, a zoom operation, a property display operation, and an event of no operation for a predetermined time period.

3. The image display device according to claim 1, wherein the image includes information indicative of an upward facing orientation or a downward facing orientation with respect to a horizontal direction, as the attitude of an image pickup apparatus when the image was photographed by the image pickup apparatus, and
    wherein said control unit controls whether or not to ignore the rotation information based on the information indicative of the upward facing orientation or the downward facing orientation.

4. The image display device according to claim 1, wherein said detection unit detects whether the image display area is in landscape position or in portrait position, as the attitude of the image display device.

5. The image display device according to claim 1, wherein the predetermined condition includes, the attitude of the image display device being maintained for a predetermined time period.

6. The image display device according to claim 1, wherein an Orientation Tag information defined by Exif is used as the rotation information.

7. A method of controlling an image display device that displays an image in an image display area, comprising:
    detecting an attitude of the image display device; and
    controlling a direction of display of the image based on rotation information added to the image and the detected attitude of the image display device, wherein the rotation information added to the image indicates an orientation of an image on the screen,
    wherein said controlling includes, if the detecting includes detecting a first rotation of the image display device from a state where a long side of the image displayed in the image display area and a long side of the image display area do not match each other, so that longitudinal sides and lateral sides of the image display device are inverted, automatically rotating the image displayed in the image display area such that the long side of the image and the long side of the image display area match each other,
    if the detecting includes detecting a second rotation of the image display device from a state where the image is displayed in the image display area such that the long side of the image and the long side of the image display area match each other, so that longitudinal sides and lateral sides of the image display device are inverted, automatically restricting rotation of the image displayed in the image display area, and wherein if a predetermined condition has occurred while the rotation of the image is restricted, the rotation information added to the image is changed based on a current display state of the image without an explicit changing operation from a user.

8. The method according to claim 7, wherein the predetermined condition comprises at least one of an image feed operation, a zoom operation, a property display operation, and an event of no operation for a predetermined time period.

9. The method according to claim 7, wherein in a case that the rotation of the image is being restricted, if the attitude of the image display device is maintained for a predetermined time period, the rotation information is changed.

10. The method according to claim 7, wherein the image includes information indicative of an upward direction or a downward direction with respect to a horizontal direction as the attitude of an image pickup apparatus which has photographed the image, and
wherein said controlling includes controlling whether or not to ignore the rotation information based on the information indicative of the upward facing orientation or the downward facing orientation.

11. The method according to claim 7, wherein said detecting includes detecting whether the image display area is in landscape position or in portrait position, as the attitude of the image display device.

12. The method according to claim 7, wherein an Orientation Tag information defined by Exif is used as the rotation information.

13. A non-transitory computer-readable storage medium storing a computer-executable program for causing a computer to execute a method of controlling an image display device that displays an image in an image display area,
wherein the method comprises:
detecting an attitude of the image display device; and
controlling a direction of display of the image based on rotation information added to the image and the detected attitude of the image display device, wherein the rotation information added to the image indicates an orientation of an image on the screen,
wherein said controlling includes, if the detecting includes detecting a first rotation of the image display device from a state where a long side of the image displayed in the image display area and a long side of the image display area do not match each other, so that longitudinal sides and lateral sides of the image display device are inverted, automatically rotating the image displayed in the image display area such that the long side of the image and the long side of the image display area match each other,
if the detecting includes detecting a second rotation of the image display device from a state where the image is displayed in the image display area such that the long side of the image and the long side of the image display area match each other, so that longitudinal sides and lateral sides of the image display device are inverted, automatically restricting rotation of the image displayed in the image display area, and
wherein if a predetermined condition has occurred while the rotation of the image is restricted, the rotation information added to the image is changed based on a current display state of the image without an explicit changing operation from a user.

* * * * *